(12) United States Patent
Springer et al.

(10) Patent No.: US 8,783,020 B2
(45) Date of Patent: Jul. 22, 2014

(54) EXHAUST SYSTEM FOR INTERNAL COMBUSTION ENGINES WITH PARTICLE FILTER (75) Inventors: Moritz Klaus Springer, Hagen (DE); Helmut Hans Ruhland, Eschweiler (DE); Thomas Lorenz, Köln (DE); Georg Louven, Neuwied (DE); Jens Dunstheimer, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 13/270,836

(22) Filed: Oct. 11, 2011

(65) Prior Publication Data

US 2012/0124995 A1  May 24, 2012

(30) Foreign Application Priority Data

Nov. 18, 2010  (DE) .......................... 10 2010 044 102

(51) Int. Cl.
*F01N 3/00* (2006.01)
(52) U.S. Cl.
USPC .................... 60/287; 60/285; 60/289; 60/290; 60/291
(58) Field of Classification Search
USPC ........................................... 60/274–324, 606
See application file for complete search history.

(56) References Cited

U.S. PATENT DOCUMENTS

| 3,669,083 | A  | * | 6/1972 | Fort ............................. 123/325 |
| 6,276,139 | B1 | * | 8/2001 | Moraal et al. ................. 60/605.2 |
| 7,644,584 | B2 | * | 1/2010 | Leustek et al. ................. 60/611 |
| 7,874,148 | B2 | * | 1/2011 | Duffield ........................ 60/297 |
| 8,099,953 | B2 | * | 1/2012 | DeHart ......................... 60/320 |
| 8,464,522 | B2 | * | 6/2013 | Fujiwara et al. ................ 60/295 |
| 2002/0083700 | A1 | * | 7/2002 | Ellmer et al. ................... 60/278 |
| 2004/0168432 | A1 | * | 9/2004 | Beylich et al. ................. 60/289 |
| 2011/0072783 | A1 | | 3/2011 | Hepburn et al. |
| 2011/0072784 | A1 | | 3/2011 | Hepburn et al. |
| 2011/0072787 | A1 | | 3/2011 | Hubbard et al. |
| 2011/0072794 | A1 | | 3/2011 | Van Nieuwstadt et al. |
| 2011/0072795 | A1 | | 3/2011 | Kerns et al. |
| 2011/0072803 | A1 | | 3/2011 | Van Nieuwstadt et al. |
| 2011/0072804 | A1 | | 3/2011 | Van Nieuwstadt et al. |
| 2011/0073070 | A1 | | 3/2011 | Ruhland et al. |
| 2011/0073088 | A1 | | 3/2011 | Hubbard et al. |
| 2012/0000180 | A1 | * | 1/2012 | Gonze et al. .................... 60/274 |
| 2012/0073270 | A1 | * | 3/2012 | Cox et al. ....................... 60/287 |

FOREIGN PATENT DOCUMENTS

| DE | 3818158 A1 | 12/1989 |
| DE | 10345986 A1 | 4/2005 |
| DE | 10361791 A1 | 7/2005 |

(Continued)

*Primary Examiner* — Jesse Bogue
(74) *Attorney, Agent, or Firm* — Julia Voutyras; Alleman Hall McCoy Russell & Tuttle LLP (57) ABSTRACT An exhaust system for an internal combustion engine is provided. The system comprises an exhaust tract which is connectable to an outlet side of the internal combustion engine, at least one catalytic converter arranged in the exhaust tract downstream of the engine, a particle filter downstream of the at least one catalytic converter, and a secondary-air inlet port provided in the exhaust tract upstream of the particle filter for introducing compressed secondary air into the exhaust tract via at least one flutter valve. In this way, additional oxygen may be supplied to the particulate filter to perform filter regeneration.

18 Claims, 3 Drawing Sheets

(56) References Cited

FOREIGN PATENT DOCUMENTS

| | | | |
|---|---|---|---|
| DE | 102004048335 | A1 | 4/2006 |
| EP | 1970547 | B1 | 9/2008 |
| FR | 2901309 | A3 | 11/2007 |
| WO | 2005045208 | A1 | 5/2005 |
| WO | 2007085654 | A1 | 8/2007 |

\* cited by examiner

EXHAUST SYSTEM FOR INTERNAL COMBUSTION ENGINES WITH PARTICLE FILTER

RELATED APPLICATIONS

The present application claims priority to German Patent Application No. 102010044102.3, filed on Nov. 18, 2010, the entire contents of which are hereby incorporated by reference for all purposes.

FIELD

The present disclosure relates to an exhaust system for internal combustion engines with a particle filter.

BACKGROUND AND SUMMARY

The pollutant emission of an internal combustion engine can be effectively reduced by the catalytic retreatment of the exhaust gas with the aid of an exhaust gas catalytic converter. To reduce the particle emission occurring, for example, during the combustion of diesel fuel, particle filters are employed which usually follow one or more exhaust gas catalytic converters. The particles retained from the exhaust gas by the particle filter, that is to say collected in the filter, are primarily soot particles. Regular cleaning or regeneration of the particle filter is necessary, depending on the soot particle load of the particle filter and the accompanying increase in the exhaust gas backpressure. This cleaning or regeneration is achieved by oxidation, that is to say the burning of the soot particles in the particle filter, with the result that the proper functioning of the particle filter is maintained while the internal combustion engine is in operation.

According to stage 6 of the European exhaust gas standard (Euro-6), stringent particle emission limit values also have to be adhered to in future for gasoline engines with direct injection. Gasoline engines, unlike diesel engines, typically are operated at or near stoichiometry. Therefore, during normal engine operation, there may not be a sufficient amount of oxygen in the exhaust to allow regeneration of the particulate filter.

An exhaust gas purification system for an internal combustion engine is known from European patent specification EP 1 970 547 B1. The exhaust gas purification system is employed in a motorcycle in order to purify the exhaust gas from the internal combustion engine by three catalytic converters connected in series in an exhaust line. It is proposed to provide, at least between the second and third catalytic converter, a secondary air introduction line for introducing secondary air into the exhaust line, in order to assist the oxidation of CO and HC in the third catalytic converter. The secondary air is supplied to the exhaust line by an air filter via a flutter valve.

The inventors have recognized herein an issue with the above approach. During typical engine operation, particularly when the particle filter has a high soot load causing increased back pressure, the exhaust pressure tends to be higher than the pressure of the secondary air, which typically is at ambient air pressure. Thus, an insufficient amount of oxygen may be provided to regenerate the filter.

An exhaust system for an internal combustion engine is provided. In one embodiment, the system comprises an exhaust tract which is connectable to an outlet side of the internal combustion engine, at least one catalytic converter arranged in the exhaust tract downstream of the engine, a particle filter downstream of the at least one catalytic converter, and a secondary-air inlet port provided in the exhaust tract upstream of the particle filter for introducing compressed secondary air into the exhaust tract via at least one flutter valve.

In this way, additional oxygen may be provided to the filter, even in low load conditions. Thus, the functioning of a particle filter of an exhaust system for an internal combustion engine may be improved at low outlay over the entire or over the largest possible operating or load range of the internal combustion engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
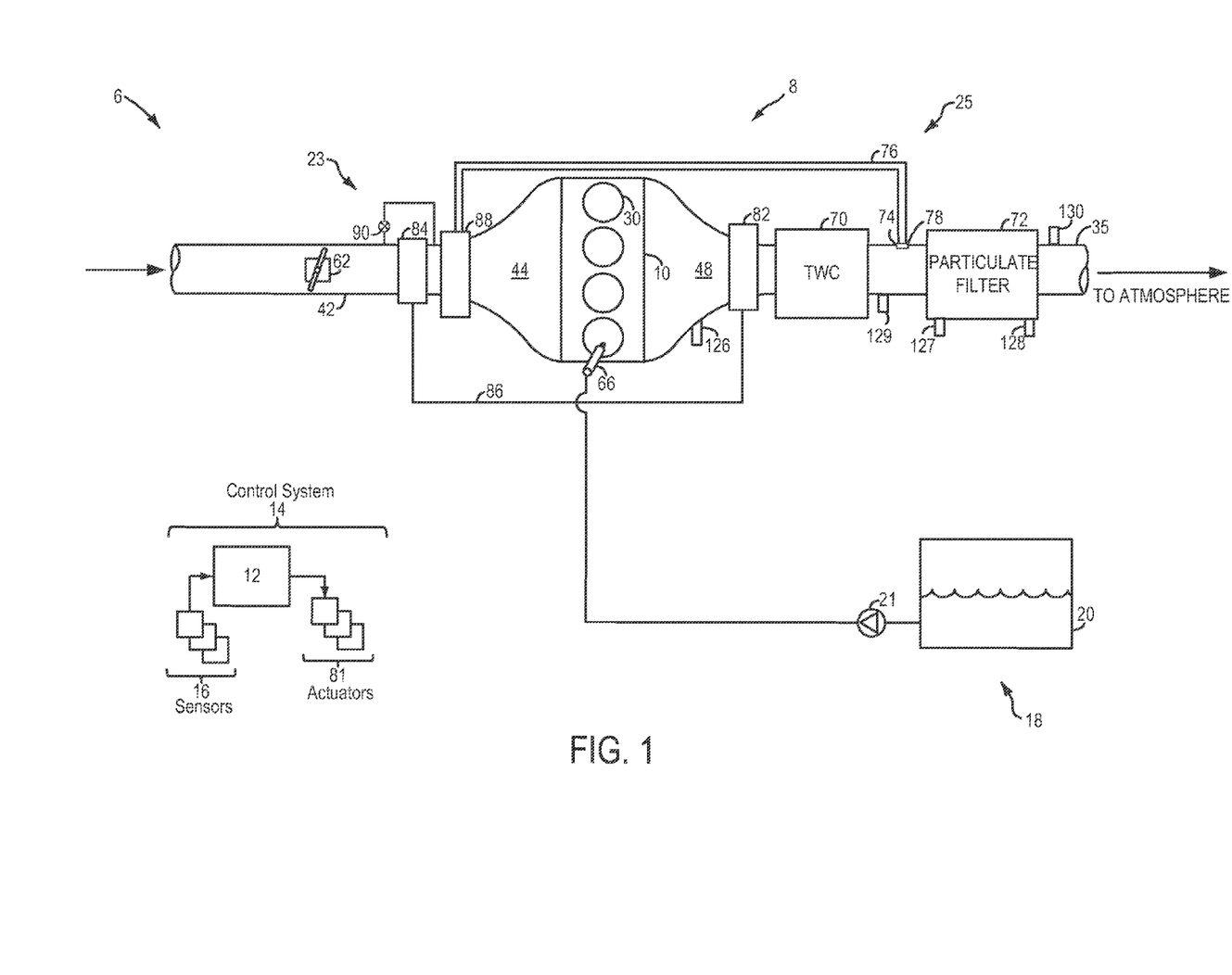
FIG. 1 is a schematic depiction of a vehicle system including the exhaust system of the present disclosure.

FIG. 1 shows a schematic depiction of a vehicle system 6. The vehicle system 6 includes an engine system 8 coupled to a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48, also referred to as an exhaust port, leading to an exhaust outlet duct 35 that routes exhaust gas to the atmosphere. The engine exhaust 25 may include one or more emission control devices 70, 72, which may be mounted in a close-coupled position in the exhaust. One or more emission control devices may include a three-way catalyst, lean NOx trap, diesel particulate filter, oxidation catalyst, etc. In the embodiment depicted in FIG. 1, a three-way catalyst (TWC) 70 is positioned upstream of a particulate filter 72. The catalyst 70 is configured to oxidize and/or reduce various exhaust emissions, such as unburnt hydrocarbons and carbon monoxide. The particulate filter 72 is configured to trap particulates in the exhaust stream and burn the particulates off at a later time. Positioned in the exhaust outlet duct 35 between the catalyst 70 and particulate filter 72 is a secondary air introduction port 74 coupling a secondary air introduction passage 76 to the exhaust outlet duct 35. Control of the secondary air introduction port 74 is through a valve 78. The valve 78 may be positioned at the secondary air introduction port 74 in the wall of the exhaust outlet duct 35, or it may be positioned at the secondary air introduction port in the secondary air introduction passage 76. The valve 78 may be a flutter valve, also known as a non-return valve, configured to open in one direction based on a pressure differential across the valve. In other embodiments, the valve 78 may be a valve controlled by a controller, such as controller 12, and configured to be blocked closed under certain operating conditions, discussed in more detail below.

Vehicle system 6 may include a supercharger. In the depicted embodiment, the supercharger is a turbocharger including a turbine 82 positioned in the exhaust passage upstream of the catalyst 70. The turbine may be coupled to a compressor 84 via a shaft 86. The turbine may be configured to utilize the exhaust gas to drive the compressor in order to compress intake air to a pressure above ambient pressure. The compressed intake air may temporarily held in a plenum 88 before being fed to the cylinders 30. As shown in FIG. 1, the plenum 88 may be coupled to the secondary air introduction passage 76 in order to provide compressed air to the intake passage upstream of the particulate filter 72. Additionally, in some embodiments, a compressor bypass valve (CBV) 90 may be arranged in a bypass passage in order to bypass intake air around the compressor. When a pressure difference across the compressor is greater than a threshold amount, damage to the compressor can occur, or unsuitable noise disturbances may occur. In such conditions, the CBV may open to allow the intake air to travel around the compressor and reduce the pressure difference across the compressor.

Fuel system 18 may include a fuel tank 20 coupled to a fuel pump system 21. The fuel pump system 21 may include one or more pumps for pressurizing fuel delivered to the injectors of engine 10, such as the example injector 66 shown. Injector 66 may be a direct injector configured to directly inject fuel into a cylinder, or in other embodiments, injector 66 may be a port injector configured to inject fuel into an intake port coupled to a cylinder. While only a single injector 66 is shown, additional injectors are provided for each cylinder. It will be appreciated that fuel system 18 may be a return-less fuel system, a return fuel system, or various other types of fuel system.

The vehicle system 6 may further include control system 14. Control system 14 is shown receiving information from a plurality of sensors 16 and sending control signals to a plurality of actuators 81. As one example, sensors 16 may include exhaust gas sensor 126 located upstream of the emission control device and exhaust gas sensors 129, 130 located downstream of the emission control device, particulate filter temperature sensor 127, and particulate filter soot load sensor 128 configured to determine a soot load on the particulate filter. Other sensors such as pressure, temperature, and composition sensors may be coupled to various locations in the vehicle system 6. As another example, the actuators may include fuel injector 66, throttle 62, valve 78, and CBV 90. The control system 14 may include a controller 12. The controller 12 may receive input data from the various sensors, process the input data, and trigger the actuators in response to the processed input data based on instruction or code programmed therein corresponding to one or more routines.

The provision of the secondary introduction port 74 with the flutter valve 78 arranged therein makes it possible to feed the secondary air and hence oxygen required for the oxidation or combustion of the soot particles in the particulate filter 72 directly into the exhaust tract. Hence, it is not necessary to introduce additional secondary air, into the combustion chamber of the internal combustion engine for example, in order to increase the proportion of oxygen that remains in the exhaust gas after combustion of the fuel in the combustion chamber and in this way to make possible the combustion of the soot particles in the particulate filter 72.

By use the secondary-air inlet port 74, the introduction of secondary air via at least one flutter valve 78 and consequently the introduction of additional oxygen, required for oxidizing or burning the soot particles in the particulate filter 72, directly into the exhaust tract are possible. Secondary air which is supplied, for example, via a combustion space (combustion chamber of a cylinder 30) of the internal combustion engine, in order to increase the fraction of unburnt residual oxygen in the exhaust gas for regenerating the particulate filter 72, is therefore not necessary.

Air excess in the combustion of fuel in the combustion space of the internal combustion engine denotes that the internal combustion engine is operated with a lean fuel/air mixture (lambda>1). However, if, for example, a three-way catalytic converter is used for exhaust gas retreatment, it is very important to adhere to a stoichiometric ratio, that is to say a fuel/air ratio in which complete combustion of the fuel used takes place (lambda=1). The exhaust system according to the disclosure therefore affords the advantage that the internal combustion engine can be operated in a normal, that is to say stoichiometric mode (lambda=1), since the secondary air for burning the soot particles in the particle filter is not introduced via the internal combustion engine, but directly into the exhaust duct upstream of the particle filter. A change in mode of the internal combustion engine, for example from normal operation to lean-mix operation especially for filter regeneration, is therefore unnecessary, and therefore engine management required for this mode changeover or engine control provided to this effect for regenerating the particle filter may be dispensed with.

The flutter valve is a nonreturn valve, which opens in one direction, to be precise the direction of passage, and closes again automatically, preferably without any other external drive, purely on account of pressure differences upon the two valve sides. The direction of passage in the context of the disclosure is to be understood as meaning the direction from outside the exhaust tract into the exhaust tract, so that secondary air can flow into the exhaust tract via the flutter valve, but exhaust gas cannot escape in an uncontrolled way out of the exhaust tract.

The flutter valve is expediently formed from an elastic material, for example from spring steel or else from plastic, the material properties at the same time being selected in such a way that they ensure leaktight closing of the valve. The material is also designed to be so rigid that, in the event of a pressure difference, such as usually occurs in an exhaust system for internal combustion engines, the function of the valve opposite to the opening direction is ensured. In an especially simple embodiment, the flutter valve may be arranged in the secondary-air inlet port in the exhaust tract. It may, however, also be arranged in the secondary-air supply line to the secondary-air inlet port.

The exhaust gas pressure changes periodically in the exhaust tract on account of the exhaust gas dynamics while the internal combustion engine is in operation. According to the disclosure, the flutter valve is designed in such a way that the periodic changes in exhaust gas pressure open or close the flutter valve without any additional external control, that is to say the flutter valve operates passively. In particular, the flutter valve opens when the exhaust gas pressure in the exhaust tract is lower than the pressure on the valve side facing away from the exhaust tract, and it closes when the exhaust gas pressure in the exhaust tract is higher than the pressure on the valve side facing away from the exhaust tract.

Secondary air thus flows periodically into the exhaust tract via the flutter valve correspondingly to the changes in exhaust gas pressure in the exhaust tract. The additional oxygen introduced together with the secondary air upstream of the particle filter into the exhaust tract is subsequently available for burning or oxidizing the soot particles in the particle filter. Essentially continuous oxidation of the soot particles in the particle filter is therefore possible. An additional pump for introducing the secondary air into the exhaust duct is not required in the exhaust system according to the disclosure. If the flutter valve closes because the exhaust gas pressure in the exhaust tract is higher than the pressure on the valve side facing away from the exhaust tract, the uncontrolled escape of exhaust gases and of the secondary air which has previously flowed in outward out of the exhaust tract is prevented automatically.

Exhaust gas dynamics of the internal combustion engine in the exhaust tract vary as a function of the power output of the internal combustion engine. In general, with an increasing load of the internal combustion engine there is a rise in the average exhaust gas pressure in the exhaust tract and therefore in the pressure which acts upon that valve side of the flutter valve which faces the exhaust tract. In order therefore to ensure that the secondary air is introduced into the exhaust tract not only in the case of a relatively low average exhaust gas pressure under the low load and/or during the idling of the internal combustion engine, but also in a high load range and therefore with relatively high average exhaust gas pressure in the exhaust tract, according to the disclosure the secondary air may comprise compressed air.

Compressed air is to be understood in the context of the disclosure as being essentially air which has a higher pressure in comparison with normal ambient air or ambient atmosphere. This ensures that, even if the average exhaust gas pressure rises within the exhaust tract, secondary air can flow into the exhaust tract, as described above, and continuous regeneration of the particle filter, even in high load states of the internal combustion engine, can be maintained. The exhaust system according to the disclosure thus has an extremely simple set-up for regenerating the particle filter or for optimal and permanent function of the particle filter and is preeminently suitable, for example, for use in a gasoline engine with a three-way catalytic converter and with a particle filter following the latter, the regeneration of the particle filter being ensured essentially in all engine load ranges.

In one embodiment of the present disclosure, the secondary air is inlet-side charge air from a supercharged internal combustion engine. For this purpose, the secondary air is expediently extracted, for example, from a plenum of the intake manifold downstream of a compressor of the supercharger. However, it is also possible to extract the secondary air from the intake pipe downstream of the compressor, and supply the air to the secondary-air inlet port in the exhaust tract via the flutter valve. Especially advantageously, the charge pressure of the supercharged internal combustion engine and therefore the pressure of the secondary air increase with an increasing load of the internal combustion engine, so that the secondary air is adapted automatically to the current operating state of the internal combustion engine and is sufficiently compressed so that it can be supplied to the exhaust tract, as already described.

Usually, under high load, for example for the protection of engine components, an internal combustion engine is operated in a below-stoichiometric or low-oxygen mode, that is to say lambda is lower than 1. In such a case, by the exhaust system according to the disclosure, it is possible to raise the oxygen fraction in the exhaust gas deliberately, upstream of the particle filter, to lambda higher than 1 in the simple way described, in order thereby to allow combustion or oxidation of the soot particles in the particle filter. This operation is additionally assisted by the high exhaust gas temperatures, provided in any case under high load by the internal combustion engine, of, for example, about equal to or higher than 550° C. The exhaust system according to the disclosure accordingly ensures in a simple way optimal and permanent functioning of the particle filter in a wide operating range of the supercharged internal combustion engine.

Alternatively or additionally to the inlet-side charge air of a supercharged internal combustion engine, the compressed secondary air may likewise be generated by an additional blower, for example by an electrically operated compressor. The air used as secondary air could, for example, also be compressed air from a compressed air reservoir which is topped up correspondingly while the internal combustion engine is in operation.

In a further embodiment of the disclosure, the secondary-air inlet port is arranged downstream of the at least one catalytic converter in the exhaust tract. In other words, in such a case, the secondary-air inlet port is arranged between the catalytic converter or catalytic converters in the exhaust tract and the particle filter, with the result that the catalytic converter or catalytic converters, in particular for example a three-way catalytic converter, can be operated at an optimal operating point in terms of the oxygen fraction contained in the exhaust gas. The secondary air, that is to say the additional oxygen, is introduced into the exhaust tract only downstream of the catalytic converter, as seen in the exhaust gas flow direction, and does not appreciably vary the stoichiometric fuel/air ratio in the catalytic converter which is important for an optimal purifying capacity of the catalytic converter.

The flutter valve may be a flutter valve controlled actively by a control unit. This makes it possible to control the introduction of secondary air into the exhaust tract or, for example, temporarily prevent this completely. The control unit can thus control the purification or regeneration of the particle filter optimally. For example, until a specific particle mass concentration is reached in the particle filter, regeneration can be prevented by keeping the flutter valve closed, and regeneration can be started and carried out, only from a predetermined particle load of the filter, by opening the flutter valve and introducing secondary air into the exhaust tract. This ensures an optimal filtering property of the particle filter while the internal combustion engine is in operation.

The exhaust system according to the disclosure can be operated with internal combustion engines which include an overrun cut-off mode. Overrun cut-off is a controlled interruption in the supply of fuel to the internal combustion engine when power is not demanded, such as during deceleration. During overrun and simultaneous overrun cut-off, air or oxygen expediently continues to be conducted through the internal combustion engine for regenerating the particle filter. It is thus possible to regenerate the particle filter in all operating states or load ranges of the internal combustion engine, without the internal combustion engine having to be controlled to an oxygen-rich lean mode (lambda>1) for this purpose. The use of additives for assisting the combustion or oxidation of the soot particles in the particle filter may also be dispensed with.

The exhaust system according to the disclosure may be used for an internal combustion engine, in particular a gasoline engine, supercharged by an exhaust gas turbocharger and having direct injection, the exhaust system having an exhaust tract which is connectable to an outlet side of the internal combustion engine and in which at least one catalytic converter, in particular three-way catalytic converter, is arranged in the downstream direction and is followed by a particle filter. Furthermore, a secondary-air inlet port for introducing secondary air into the exhaust tract via a flutter valve is provided between the catalytic converter and the particle filter, and the secondary air is inlet-side charge air of the supercharged internal combustion engine.

In another embodiment, the system of FIG. 1 may include a vehicle system, comprising a direct-injected gasoline engine, a compressor driven by a turbine, an exhaust system including a particulate filter, and a controller having instructions executable to divert a portion of intake air downstream of the compressor to the exhaust system upstream of the particulate filter, and when the portion of diverted intake air decreases, adjust a CBV to increase bypass of intake air around the compressor.

Figure 2:
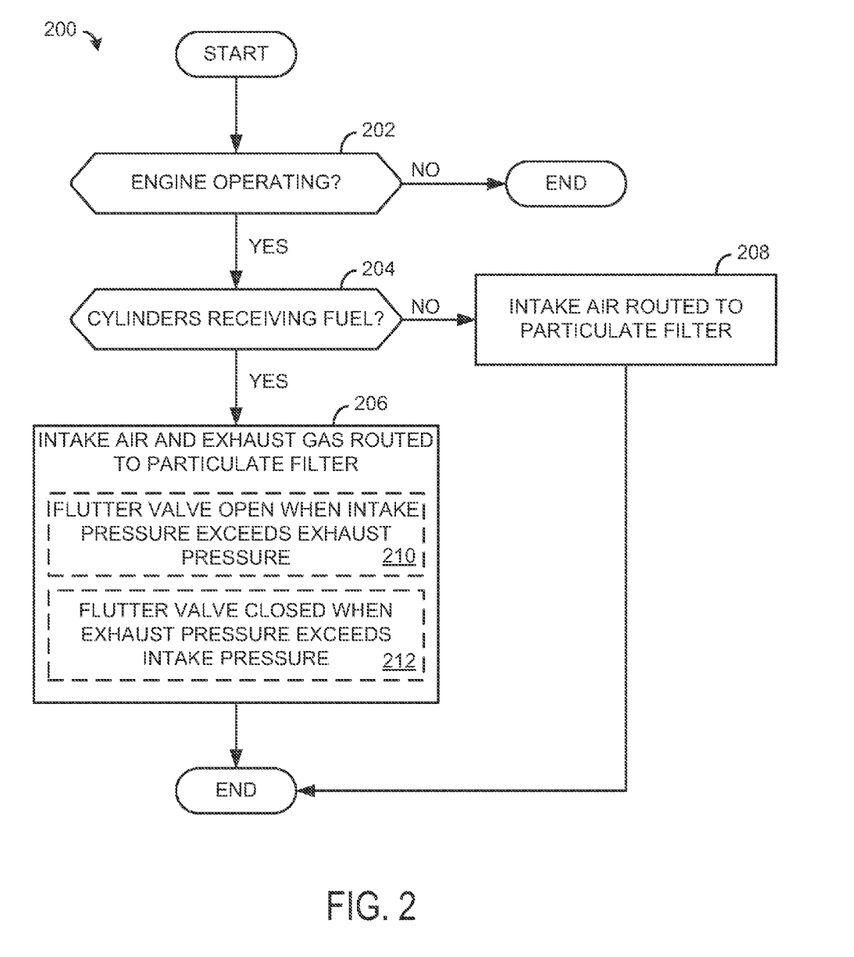
FIG. 2 is a flow chart illustrating a method for routing intake air and exhaust gas in an exhaust system according to one embodiment of the present disclosure.

Turning to FIG. 2, a method 200 for routing intake air and exhaust gas in an engine is shown. Method 200 may be carried out by a controller of the engine, such as controller 12. Method 200 comprises, at 202, determining if the engine is operating. Engine operation may be determined by any suitable method, such as whether the ignition key in an on or off state. If the engine is not operating, method 200 ends. However, if the engine is operating, method 200 proceeds to 204 to determine if the cylinders of the engine are receiving fuel. During engine overrun cutoff conditions, such as while the vehicle is decelerating, engine power may not be required and thus fuel injection to the cylinders may be suspended to conserve fuel. If it is determined the cylinders are receiving fuel, method 200 proceeds to 206. However, if the cylinders are not receiving fuel, no combustion is occurring in the cylinders, and as a result, exhaust gas is not produced. The intake and exhaust valves that control the flow of air through the cylinders may still be opening and closing, pumping intake air through the cylinders. Thus, at 208, method 200 comprises intake air being routed to the particulate filter. In addition to the air routed to the particulate filter via the cylinders, intake air may also be routed through the secondary air introduction port, depending on the pressure differential across the valve positioned in the secondary air introduction port. If the answer to the question at 204 is yes and the cylinders are receiving fuel, exhaust gas is produced during combustion. As a result, at 206, intake air and exhaust are routed to the particulate filter. The exhaust gas is continuously routed to the particulate filter. If intake air pressure is greater than exhaust pressure, the flutter valve positioned in the secondary air introduction port opens at 210 to route intake air through the valve to the particulate filter. Exhaust gas from the combustion in the cylinders is also routed to the particulate filter at 210. However, if intake pressure is not greater than exhaust gas pressure, the flutter valve is closed at 212. Thus, exhaust gas from the cylinders is routed to the particulate filter while intake air is blocked from reaching the particulate filter.

Figure 3:
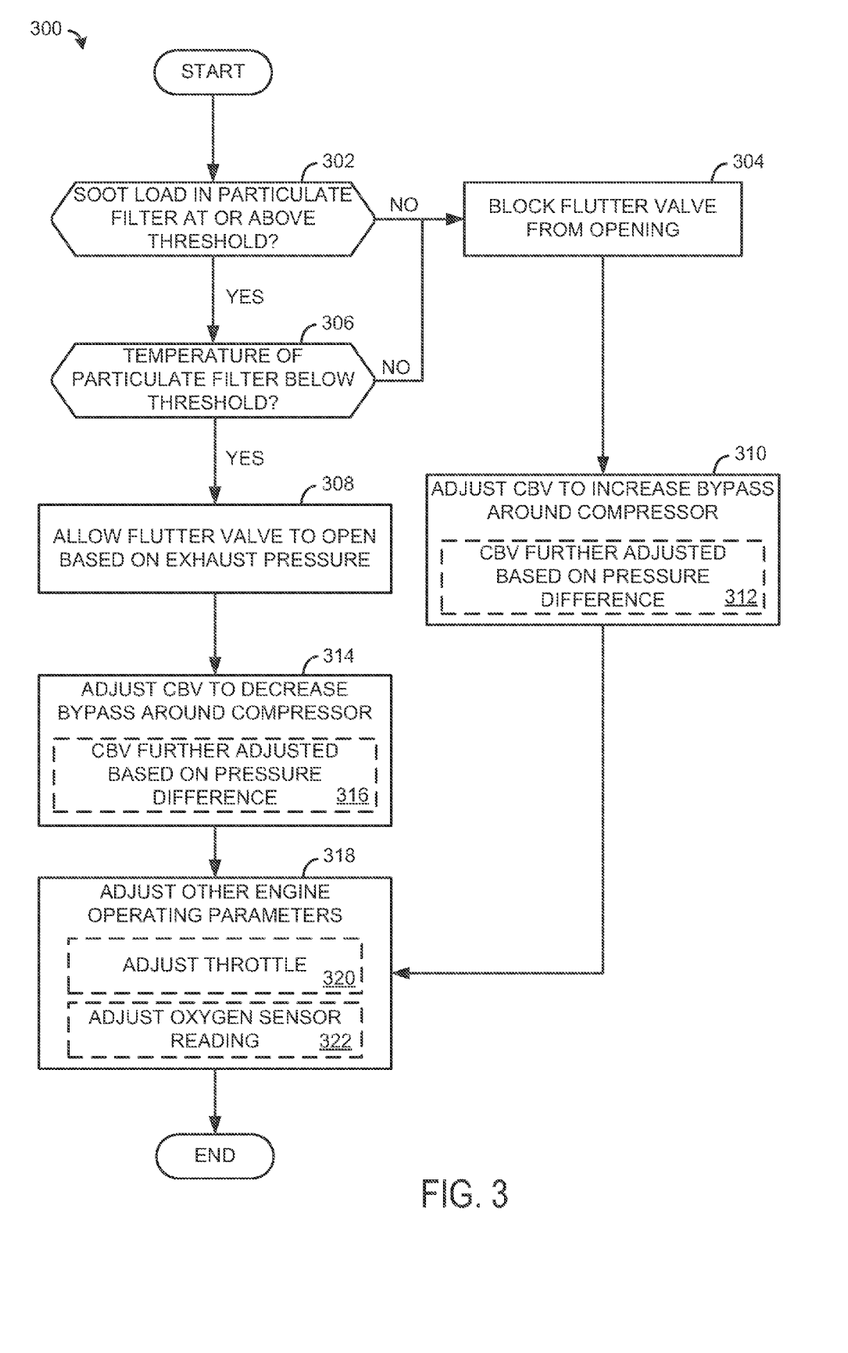
FIG. 3 is a flow chart illustrating a method for routing ambient air and exhaust gas in an exhaust system according to another embodiment of the present disclosure.

FIG. 3 depicts a method 300 for controlling the routing of intake air and exhaust gas in an engine, in response to various engine operating parameters, according to another embodiment of the present disclosure. Method 300 may be carried out by a control unit of the vehicle system, such as controller 12. Method 300 comprises, at 302, determining if a particulate soot load on the particulate filter is above a threshold. The threshold may be set in any suitable manner and may indicate the particulate filter soot capacity. The soot load may be determined by a sensor, such as sensor 128. If the soot load is less than the threshold, the flutter valve is blocked from opening at 304 to prevent intake air from reaching the particulate filter, and thus prevent filter regeneration. If the soot load is greater than or equal to the threshold, method 300 proceeds to 306 to determine the temperature of the particulate filter. If the temperature of the particulate filter is above a threshold, method 300 again proceeds to 304 to block the flutter valve from opening, to prevent regeneration at high temperature, which can damage the particulate filter. If the temperature is below a threshold, method 300 proceeds to 308 to allow the flutter valve to open based on exhaust pressure. The flutter valve may open when the pressure in the secondary air introduction passage exceeds exhaust pressure.

Whether the flutter valve is open or closed may affect other engine operating parameters. For example, in embodiments where the vehicle system includes a CBV, opening and closing of the CBV may be coordinated with opening and closing of the flutter valve. After blocking the flutter valve closed at 304, method 300 may proceed to 310 to adjust the CBV to increase the bypass of air around the compressor. This may further include opening the CBV when a pressure difference across the compressor exceeds a threshold at 312. Additionally, after opening the flutter valve based on intake air pressure, method 300 may proceed to 314 adjust the CBV to decrease the bypass air around the compressor. This may include closing the CBV when a pressure difference across the compressor is below a threshold at 316, which can include partially closing or completely closing the CBV. In this way, when the flutter valve is blocked from opening, the CBV can be used to prevent pressure fluctuations across the compressor that can lead compressor surge. However, when the flutter valve is not blocked from opening, the CBV may be closed, as the intake air diverted via the flutter valve to the exhaust tract may reduce the pressure downstream of the compressor to a sufficient enough level to make use of the CBV unnecessary.

In addition to regulating the CBV, other engine operating parameters may be adjusted based on whether the flutter valve is open or blocked closed at 318. For example, the throttle may be adjusted at 320, to compensate for the fluctuating portion of intake air diverted to the exhaust tract. At 322, sensors located downstream of the secondary air intake port, particularly oxygen sensors may have their readings adjusted based on the opening or closing of the flutter valve. As the flutter valve opening allows non-combusted intake air to mix with combusted air in the exhaust tract, the oxygen sensor readings used to determine air-fuel ratio, catalyst activity, etc., may be inaccurate. The readings may be adjusted to account for the additional lean air in the exhaust tract.

FIGS. 2 and 3 depict various embodiments for routing intake air and exhaust gas to a particulate filter. The routing of intake air to the particulate filter at 208, 206, and 308 allows for excess oxygen to be present in the particulate filter to perform a filter regeneration. On the other hand, when the non-return valve is closed or prevented from opening, such as at 212 and 304, excess oxygen does not reach the particulate filter, and regeneration is not performed. It is to be understood that when the non-return valve is controlled to be blocked closed, the non-return valve still opens based on the pressure of the compressed intake air versus the pressure of the exhaust gas, as described with respect to FIG. 1 above, when it is allowed to be open. Thus, in one embodiment, the methods of FIGS. 2 and 3 may include a method for controlling air flow in an engine, comprising diverting a portion of intake air downstream of a compressor to an exhaust tract upstream of a particulate filter, and adjusting a compressor bypass valve based on the diverting.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted.

Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust system for an internal combustion engine, comprising:
   an exhaust tract which is connectable to an outlet side of the internal combustion engine;
   at least one catalytic converter arranged in the exhaust tract downstream of the engine;
   a particulate filter downstream of the at least one catalytic converter;
   a secondary-air inlet port provided in the exhaust tract upstream of the particulate filter for introducing secondary air compressed by a turbocharger compressor into the exhaust tract via at least one flutter valve, wherein the compressed secondary air is introduced into the exhaust tract downstream of the at least one catalytic converter and upstream of the particulate filter; and
   a controller having non-transitory instructions executable to:
      adjust an opening of a compressor bypass valve based on the compressed secondary air introduced into the exhaust tract as controlled by the flutter valve,
      wherein the flutter valve is controlled by a controller to be blocked closed when a soot load of the particulate filter is below a threshold.

2. The exhaust system of claim 1, wherein the flutter valve is configured to open when air pressure of the compressed secondary air is greater than exhaust gas pressure in an exhaust outlet duct.

3. The exhaust system of claim 1, wherein during normal engine operation, the internal combustion engine is configured to direct exhaust gas produced during combustion from one or more cylinders to the at least one catalytic converter and the particulate filter via the exhaust tract.

4. The exhaust system of claim 3, wherein during engine overrun cutoff conditions, the internal combustion engine is configured to direct ambient air pumped through the one or more cylinders to the at least one catalytic converter and particulate filter via the exhaust tract.

5. The exhaust system of claim 1, wherein the flutter valve is controlled by a controller to be blocked closed when a temperature of the particulate filter is above a threshold.

6. A method for controlling air flow in an engine, comprising:
   diverting a portion of intake air downstream of a turbocharger compressor to an exhaust tract upstream of a particulate filter and downstream of an exhaust catalyst via a flutter valve; and
   adjusting a compressor bypass valve coupled across the turbocharger compressor to increase bypass of the intake air around the turbocharger compressor as the flutter valve decreases the diverted portion of the intake air.

7. The method of claim 6, wherein diverting the portion of the intake air downstream of the turbocharger compressor to the exhaust tract upstream of the particulate filter further comprises diverting a portion of the intake air from a plenum through a secondary air passage coupled to the exhaust tract.

8. The method of claim 7, wherein diverting the portion of the intake air through the secondary air passage further comprises diverting the portion of the intake air through the secondary air passage controlled by the flutter valve.

9. The method of claim 8, further comprising blocking the flutter valve closed and opening the compressor bypass valve when a soot load of the particulate filter is below a threshold.

10. The method of claim 8, further comprising blocking the flutter valve closed and opening the compressor bypass valve when a temperature of the particulate filter is above a threshold.

11. The method of claim 6, further comprising directing intake air not diverted to the exhaust tract to one or more cylinders of the engine.

12. A vehicle system, comprising:
   a direct-injected gasoline engine;
   a compressor driven by a turbine;
   an exhaust system including a particulate filter; and
   a controller having instructions executable to:
      divert a portion of intake air downstream of the compressor to the exhaust system upstream of the particulate filter via a flutter valve; and
      when the flutter valve decreases the diverted portion of the intake air, adjust a CBV to increase bypass of intake air around the compressor.

13. The system of claim 12, wherein the instructions are further executable to, when the portion of diverted intake air increases, adjust the CBV to decrease the bypass of the intake air around the compressor.

14. The system of claim 13, wherein the instructions are executable to adjust the CBV to decrease the bypass of intake air around the compressor in response to a pressure difference across the compressor.

15. The system of claim 12, wherein the instructions are further executable to, when the portion of diverted intake air increases, adjust the CBV to block the bypass of the intake air around the compressor.

16. The system of claim 12, wherein the instructions are executable to adjust the CBV to increase the bypass of intake air around the compressor in response to a pressure difference across the compressor.

17. The system of claim 12, wherein the instructions are executable to divert the portion of intake air downstream of the compressor to the exhaust system upstream of the particulate filter via the flutter valve.

18. The system of claim 17, wherein the instructions are executable to block the flutter valve from opening when a soot load of the particulate filter is below a first threshold and/or when a temperature of the particulate filter is above a second threshold, the system further comprising a three-way catalyst upstream of the particulate filter and upstream of where the diverted air is introduced in the exhaust system.

* * * * *